United States Patent
Paolilli et al.

(10) Patent No.: US 10,183,471 B2
(45) Date of Patent: Jan. 22, 2019

(54) METAL TRANSFER FILM AND METHOD OF USING SAME

(71) Applicants: Tracy A. Paolilli, East Greenwich, RI (US); Jan Moritz, Bristol, RI (US); G. Vincent Sharps, Jr., North Kingstown, RI (US)

(72) Inventors: Tracy A. Paolilli, East Greenwich, RI (US); Jan Moritz, Bristol, RI (US); G. Vincent Sharps, Jr., North Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 495 days.

(21) Appl. No.: 15/050,348

(22) Filed: Feb. 22, 2016

(65) Prior Publication Data

US 2017/0239926 A1   Aug. 24, 2017

(51) Int. Cl.
*B32B 37/00* (2006.01)
*B32B 7/00* (2006.01)
(Continued)

(52) U.S. Cl.
CPC .............. *B32B 37/025* (2013.01); *B32B 7/06* (2013.01); *B32B 7/12* (2013.01); *B32B 15/082* (2013.01); *B32B 27/08* (2013.01); *B32B 27/18* (2013.01); *B32B 27/20* (2013.01); *B32B 27/36* (2013.01); *B32B 2250/02* (2013.01); *B32B 2250/03* (2013.01); *B32B 2255/10* (2013.01);
(Continued)

(58) Field of Classification Search
CPC ......... B32B 37/00; B32B 37/02; B32B 37/02; B32B 37/025; B32B 7/00; B32B 7/06; B32B 7/10; B32B 7/12; B32B 15/00; B32B 15/08; B32B 15/082; B32B 15/08; B32B 27/00; B32B 27/08; B32B 27/10; B32B 27/18; B32B 27/20; B32B 27/30; B32B 27/36
See application file for complete search history.

(56) References Cited

U.S. PATENT DOCUMENTS 4,704,325 A * 11/1987 Crocker .................. B32B 15/08
                                                               428/323
5,268,733 A   12/1993 Wright et al.
(Continued)

*Primary Examiner* — Jacob T Minskey
*Assistant Examiner* — Matthew Hoover
(74) *Attorney, Agent, or Firm* — Rogowski Law LLC

(57) ABSTRACT

A metal transfer film of thermoplastic polymer includes a polymeric carrier film, a layer of metal to be transferred onto an article, and a layer of retention adhesive suitable for bonding the transferred metal layer to a surface of the article. The transferable metal layer is adjacent between the carrier film and the retention adhesive layer. Optionally, the carrier film has a releasably adhesive layer on the side in contact with the metal. The retention adhesive is a polyvinyl amine crosslinked with citric acid. The retention adhesive is deposited on the metal layer from a liquid solution and dried to a non-tacky, solid coating enabling handling of the metal transfer film in conventional film processing unit operations. The dry retention adhesive can be activated by the metal transfer operator remotely from the adhesive application process and provides significant oxygen, moisture and aroma barrier properties to the metal covered article.

8 Claims, 1 Drawing Sheet

(51) Int. Cl.
*B32B 15/00* (2006.01)
*B32B 27/00* (2006.01)
*B32B 7/12* (2006.01)
*B32B 15/082* (2006.01)
*B32B 7/06* (2006.01)
*B32B 27/08* (2006.01)
*B32B 27/18* (2006.01)
*B32B 27/20* (2006.01)
*B32B 27/36* (2006.01)

(52) U.S. Cl.
CPC ..... *B32B 2255/205* (2013.01); *B32B 2255/26* (2013.01); *B32B 2255/28* (2013.01); *B32B 2264/102* (2013.01); *B32B 2264/104* (2013.01); *B32B 2270/00* (2013.01); *B32B 2272/00* (2013.01); *B32B 2307/40* (2013.01); *B32B 2307/406* (2013.01); *B32B 2307/416* (2013.01); *B32B 2307/50* (2013.01); *B32B 2307/538* (2013.01); *B32B 2307/724* (2013.01); *B32B 2307/726* (2013.01); *B32B 2307/7244* (2013.01); *B32B 2307/7246* (2013.01); *B32B 2307/748* (2013.01); *B32B 2367/00* (2013.01); *B32B 2439/70* (2013.01)

(56) References Cited

U.S. PATENT DOCUMENTS

| | | |
|---|---|---|
| 6,835,461 B1 | 12/2004 | Yamagata et al. |
| 2014/0124128 A1* | 5/2014 | Moritz ................. B32B 37/025 156/233 |
| 2015/0114551 A1 | 4/2015 | Moritz |
| 2015/0183569 A1* | 7/2015 | Paolilli .................... B29D 7/01 206/524.2 |
| 2015/0203720 A1 | 7/2015 | Inui et al. |

* cited by examiner

METAL TRANSFER FILM AND METHOD OF USING SAME

FIELD OF THE INVENTION

This invention relates to metal transfer film technology for placing a layer of metal onto a surface of a substrate using a transfer film. More specifically it relates to depositing metal onto the substrate using a multilayer metal transfer film that includes in the following order, a) a metal-releasable polyester carrier film, b) a metal layer, and c) a retention adhesive composed of a citric acid-modified polyvinyl amine. The retention adhesive serves to permanently bond the metal layer to the substrate and provides resistance to migration through the adhesive of moisture, oxygen and odorous compounds.

BACKGROUND OF THE INVENTION

The transfer film method is an industrially important technique for transferring a thin layer of metal to a substrate. This technique is used when the situation is not practical to metalize substrates directly. The substrate can be a flexible or rigid article such as polymeric film or paperboard sheet. The resulting metal coated substrates have various commercial end use applications among which packaging material is one good example. The metal on the substrate can perform different functions. Providing an aesthetically pleasing decorative appearance is a leading purpose for placing metal on the substrate.

Typical transfer film methods initially deposit a coating of metal to be transferred onto a surface of a carrier film. The carrier film usually has a polymeric base layer having a release layer coated on one side. The carrier film is made in a multi-step process of producing the base layer then coating release material on the polymeric base layer. The release material can be applied continuously directly after formation of the base layer. Alternatively in a discontinuous technique, the base layer can be isolated as uncoated film, stored for a time, retrieved from storage, and then coated with release material at the same or different location from that of base layer formation. Usually in a separate process, a metal layer is put on the release layer of the carrier film for example by vapor or sputter metal deposition thus forming the metal transfer film. The individual metal transfer film fabrication steps may be carried out at different locations by different converters. A disadvantage is that many processing steps are required.

The metal transfer film can be handled in film fabrication operations, optionally stored, and ultimately used in later steps of the transfer method. The release layer composition has metal adhesive properties for temporarily holding the metal on the carrier film during metal transfer film handling and releasing the metal at time of transfer. To transfer the metal, a traditionally liquid and/or tacky retention adhesive is coated onto the receiving surface of the substrate and then the exposed metal side of the metal transfer film is contacted with that adhesive coated surface. The retention adhesive is usually activated by applying heat and/or pressure that causes the metal side of the metal transfer film to bond to the substrate. Lastly, the carrier film is peeled from the substrate. Due to the weaker metal adhesion of the release layer compared to the retention adhesive, the carrier film separates from the metal layer leaving a durably adhered metal surface on the substrate.

The primary function of the release layer is to provide appropriately minimal adhesion between the polymeric film surface and the metal layer. The adhesion of the metal to the carrier film surface should be strong enough to endure handling in manufacture, packaging, shipping and similar operations of the metal transfer film prior to transferring the metal layer. However, release layer adhesion should be sufficiently weak that the metal layer cleanly separates from the carrier film surface when contacted with the substrate.

As a result of material handling during the metal transfer operation, the carrier film is generally not suitable for re-use directly following removal from the transferred metal. The spent carrier film might be recovered and regenerated by melting and reforming the polymer as film or raw material for some other product. However, the release material normally is a release agent dispersed in a polymeric binder that is different from the base layer polymer. The presence of release layer material in a melt blend of recovered carrier film adversely affects quality of the blend and thereby limits the potential uses of the blended product. There is a need for a metal transfer film having the transfer film consist of a single polymer composition and release agent such that polymer of a carrier film recovered from a metal transfer film can be recycled without contamination by different polymers present in the release layer.

Accordingly a method is needed for metal transfer from a polymeric carrier film that does not have a release layer with a foreign polymeric component. It is thus desired to have a complete carrier film for metal transfer in which the polymeric component is a single composition. This feature would enable recycling of the used carrier film after the metal has been transferred. It is especially desired to have a polyester-based carrier film and transfer film that is free of a release layer having polymer other than polyester.

To accomplish metal transfer as noted above, the liquid and/or tacky retention adhesive is deposited onto the surface of the substrate that is then brought into contact with the metal layer comparatively weakly adhered to the carrier film. After activation the cured retention adhesive durably and strongly bonds the transferred metal layer to the substrate. The carrier film then can be removed to leave the metal layer permanently affixed to the substrate. This technique calls for the fabricator of the finished metalized article to coat the retention adhesive on the substrate continuously and shortly before contact by the metal layer. This demands providing an inventory of adhesive, applying the adhesive, maintaining coating equipment, and disposing of any waste from the coating unit operations. It would be an improvement providing simplicity, convenience and increased productivity if the fabricator could use metal transfer film with a dry retention adhesive pre-coated on the metal surface.

Such a method has not been available heretofore because the retention adhesive is usually in liquid form with adhesively active components dissolved in a suitable solvent. Although organic solvents can be used, water is preferred because of the greater safety compared to processing organic solutions, and removing and handling recovered volatile organic solvent. Removing the solvent bonds the metal layer to the substrate. Solution form of the retention adhesive prohibits coating, packaging, storing and delivering the metal transfer film to the fabricator in advance of the metal transfer process step. A metal transfer film pre-coated on the metal layer with a dry, ready to activate, retention adhesive is needed.

Packaging for food and other odor generating substances is a common use for metalized articles produced using the metal transfer film technique. The contents of such packaging, especially foods, are vulnerable to spoiling from extended exposure to moisture and/or oxygen from air.

Package material suppliers find it important to reduce the outward migration of odorous compounds from aromatic substances. It is also desirable to provide packaging that effectively inhibits the inward migration of ambient odor causing agents, moisture and oxygen from the environment for the purpose of extending the freshness of packaged goods. Each layer of a product metalized packaging material including a substrate polymeric film, the metal layer and the intermediate retention adhesive, of a packaging film, for example, can contribute to the barrier inhibiting transfer of odorous substances, water vapor and/or oxygen.

In the metal transfer film art various types of retention adhesives are available, for example, polyurethane, acrylic polymer, polyvinyl alcohol and ethylene vinyl alcohol copolymer and the like. However, they have metal adhesion and barrier properties of different effectiveness. It is very much desired to provide a retention adhesive that has excellent bond strength between metal and substrate and also has superior resistance to transmission of oxygen and moisture.

SUMMARY OF THE INVENTION

The present invention provides a multilayer metal transfer film for applying a metal coating to a product article, such as a packaging film. The metal transfer film includes a monolithic or multilayer polymeric carrier film, a layer of metal coextensively in contact directly adjacent to one side of the carrier film, and a retention adhesive coating coextensively in contact directly to the side of the metal layer opposite the carrier film. The retention adhesive is a polymer including polyvinyl amine monomer which is crosslinked with citric acid.

Conventional carrier films that include at least one polymeric film supporting layer and a traditional release agent layer known in the metal transfer film field can be used In a preferred embodiment, the carrier film composition consists essentially of thermoplastic polyester and a release agent in which the release agent is present as a blend with the polyester in at least one of any of the carrier film layers. In a much preferred embodiment, there is no release layer present of release agent either alone or blended with a non-polyester polymeric component. The release agent preferably is an anionic surfactant, non-ionic surfactant, about 0.1-1 wt % paraffin wax dispersed in the polyester, or a combination of them.

The invention thus provides a metal transfer film used in transferring a thin layer of a metal onto a substrate, the film having a thickness of about 4-75 µm and consisting of (A) a carrier film comprising polymer and release agent, and defining a metal contact surface on one side of the carrier film, (B) a transferable layer of the metal in direct contact with the metal-contacting surface of the carrier film and having a thickness equivalent to an optical density of about 0.2 to about 4, and (C) an optically clear, dry, nontacky, solid adhesive layer of retention adhesive directly in contact with the transferable layer on a side of the metal transfer film opposite the carrier film, the retention adhesive comprising modified polyvinyl amine composed of a vinylamine polymer crosslinked by citric acid.

There is also provided a method of transferring a thin layer of a metal onto a substrate comprising the steps of (A) providing a metal transfer film having a thickness of about 4-75 µm and consisting of (i) a carrier film comprising polymer and release agent, and defining a metal contact surface on one side of the carrier film, (ii) a transferable layer of the metal in direct contact with the metal-contacting surface of the carrier film and having a thickness equivalent to an optical density of about 0.2 to about 4, and (iii) an optically clear, dry, nontacky, solid adhesive layer of retention adhesive directly in contact with the transferable layer on a side of the metal transfer film opposite the carrier film, the retention adhesive comprising modified polyvinyl amine composed of a vinylamine polymer crosslinked by citric acid, (B) providing a substrate article, (C) contacting the adhesive layer of the metal transfer film with a surface of the substrate article, (D) heating the metal transfer film effectively to activate the retention adhesive, while pressing the metal transfer film against the surface effectively to cause the retention adhesive to bond the transferable layer of metal to the substrate, and (E) removing the carrier film from the metal layer, thereby leaving the metal on the surface of the substrate.

DETAILED DESCRIPTION OF THE INVENTION

Introduction

As used herein, "off line coating" means a technique of applying a fluid coating material onto a completed film. As used herein, "inline coating" means a technique of applying a fluid coating material onto film continuously during the process of film formation by the film manufacturer.

The term "PVA" means polyvinyl amine and "c-PVA" means polyvinyl amine crosslinked with citric acid, sometimes referred to as "citric acid modified PVA, as further defined herein.

This invention is directed to placing a thin layer of metal on the surface of an article, the surface material of the article being sometimes referred to as the substrate. The placement of the metal is accomplished by unit operations of industrial metal transfer technology. This technology utilizes a thin, flexible carrier film, a layer of metal deposited on the film to be transferred to the substrate, and a retention adhesive that bonds the transferred metal layer to the surface of the substrate. According to the present invention the carrier film preferably is a polymeric film composed of polymer from a single class, such as polyester, polyolefin, polyamide, and the like, and a release agent. The release agent is blended with a polymer from the single class. The carrier film does not possess a release layer containing polymer from different polymeric classes.

The metal layer is placed in intimate, direct contact with a metal-contacting surface of the carrier film. Traditionally, the composite of carrier film with metal layer are considered to be a "metal transfer film". For the present invention, an adhesive layer of a retention adhesive is coated from preferably aqueous solution on the exposed surface of metal. The wet coat is dried to form a dry, non-tacky, solid layer of retention adhesive such that the novel metal transfer film includes a carrier film with release agent component, a metal layer and a retention adhesive layer. Thus the structure of the metal transfer film of this invention differs from the traditional structure by inclusion of the adhesion layer.

To complete the metal transfer operation, the adhesive layer of the metal transfer film is placed in adjacent contact with the surface of the substrate, heat is applied to activate the retention adhesive and pressure is applied to force the metal transfer film against the substrate. The metal layer becomes bonded to the surface of the substrate by the retention adhesive and the carrier film is removed by separating from the metal layer to produce a metal layer on the surface of the substrate.

Figure 1:
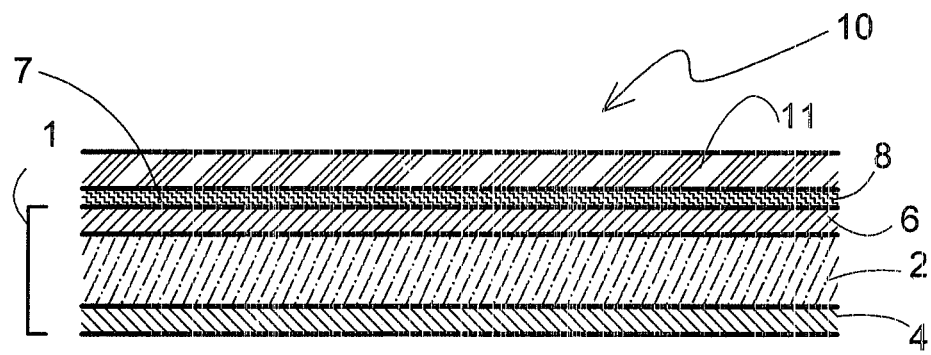
FIG. 1 is a schematic cross section view of an embodiment of the novel metal transfer film.

FIG. 1 schematically illustrates in cross section an embodiment of the novel metal transfer film 10. It has a multilayer polymeric carrier film 1 having a core layer 2, a first skin layer 6 on one side of the core layer, and a second skin layer 4 on the side of the core layer opposite layer 6. The polymer of each layer is polyester. A side of skin layer 6 defines the metal-contacting surface 7. A metal layer 8, for example of aluminum, is positioned adjacent to carrier film 1 in direct contact with the metal-contacting surface 7. A layer of retention adhesive 11 is positioned adjacent to the side of the metal layer 8 opposite the carrier film. Adhesive layer 11 can be coated onto the metal layer as liquid, preferably in aqueous solution of the retention adhesive components dissolved in water. FIG. 1 shows the retention adhesive in dry, solid, non-tacky form after the solvent of deposition solution has been removed.

Figure 2:
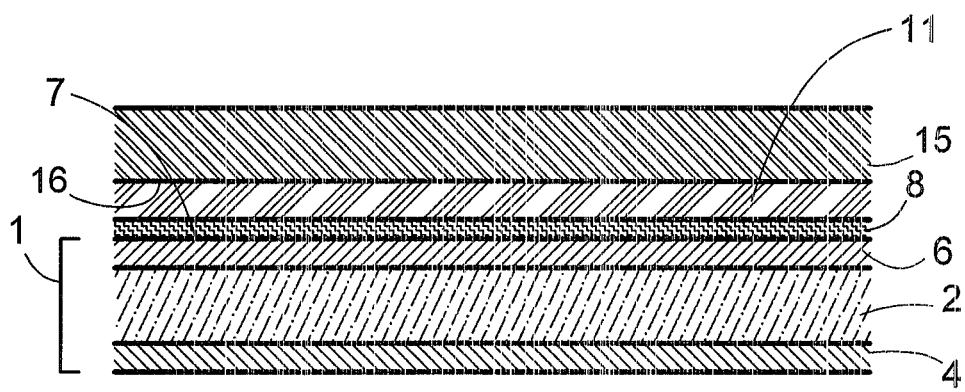
FIG. 2 is a schematic cross section view of the metal transfer film of FIG. 1 shown in contact with the surface of an article onto which a metal layer is about to be transferred.
Figure 3:
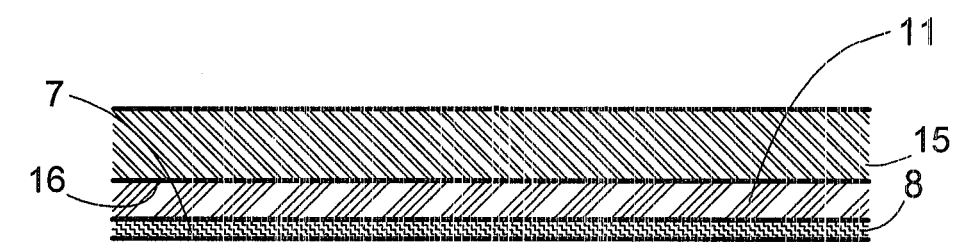
FIG. 3 is a schematic cross section view showing the metal layer adhered to the surface of the article of FIG. 2 after the carrier film has been separated.
Figure 3:
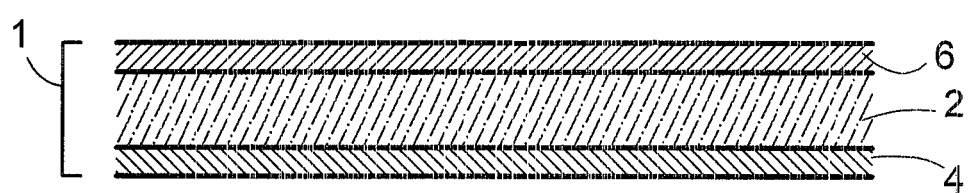

FIG. 2 shows an article having a substrate 15 with a surface 16 onto which metal is to be applied by the metal transfer operation. The novel metal transfer film of FIG. 1 is seen in contact with the article such that retention adhesive 11 directly contacts surface 16 of the substrate. The assembled substrate and metal transfer film can be subjected to heat and pressure conditions further explained herein to cause activation of the retention adhesive. Prior to activation, the retention adhesive is a dry, non-tacky, solid layer on the metal transfer film and permits the metal transfer film to be processed in conventional film handling equipment, for example for winding into a roll, storing in roll form, unwinding from the roll and moving in film conveyor unit operations. When activated, the retention adhesive tackifies to bond the metal layer 8 to surface 16 of substrate 15. When a strong bond of the retention adhesive between substrate and metal develops, the carrier film 1 can be separated from the metal layer as seen in FIG. 3. Typically the assembly of FIG. 2 can be cooled to a temperature lower than the adhesive activation temperature for a short duration allowing the retention adhesive to set before separating the carrier film. Usually the carrier film is separated by peeling from the metal layer.

Carrier Film

The primary functions of the carrier film is to receive, carry and transfer some or all of the metal from the metal layer onto a surface of a substrate. The term "carrier film" means a thin, flexible film composite of a structurally supportive polymeric base and a release layer of a composition selected to have somewhat weak adhesion between the polymeric base and a transferable layer of metal intended to be deposited on the carrier film. By "somewhat weak" is meant that the metal adhesion is high enough to maintain the metal layer intact on the polymeric base while the metalized carrier film is handled prior to the metal transferring process step but is suitably low that the metal separates and moves completely to the product substrate surface in the transfer process. Any carrier film polymer and release layer material compositions well known in the industry are suitable for use with the present invention. Traditional polymer processing methods can be used to fabricate extruded biaxially oriented single or multilayer carrier film.

Great preference is given to using a novel carrier films disclosed in U.S. patent application Ser. Nos. 13/930,395 and 14/586,785, both of J. Moritz. Preferably the single class of polymer utilized for this preferred carrier film is polyester. These preferred carrier films have release agent dispersed in the polyester and do not contain a separate release layer with a polymer different from polyester. For this reason, they have fabrication advantages and can the polymer can be efficiently reclaimed after use in metal transfer operations. They also advantageously have surface characteristics that enable transfer of metal to the product substrate with very high gloss that is much desired in the industry.

The preferred polyester carrier film has two sides. It can be monolithic consisting only of one layer or it can have a composite structure of multiple layers. A preferred embodiment of the invention includes at least a two layer coextruded polyester carrier film, that includes at least one outer layer A adjacent one side of a core layer B. The carrier film optionally can also have an outer layer C on the side of the core layer opposite of layer A. Other embodiments may include one or more inner layers $I_1, I_2, I_3, \ldots I_n$, positioned between the outermost and B layers, such as an $A/I_1/I_2/B/C$ structure, for example. The outermost layers, whether A, B, or C, are sometimes referred to as skin layers. In a multilayer structure the carrier film layers are fused adjacent to each other, preferably by a thermal fusion process such as coextrusion such that layers will not delaminate under metal transfer film processing conditions. Preferably the core layer is the predominant layer in thickness and bulk of the whole polyester-based carrier film. Any layer may contain reclaimed polyester resin. "Reclaimed polyester resin" means polyester recovered from a finished polyester product or waste from polyester product fabrication process.

Either or both outer surfaces of the skin layers of the preferred polyester carrier film have metal adhesion of less than 100 g/in, preferably less than 50 g/in, and more preferably less than 20 g/in, measured as described in Test Methods section below. The metal adhesion property is achieved by blending release agent into the polyester of the film in amounts of release agent effective to provide a desired degree of metal adhesion called for by a converter in a metal transfer film process. By comparison, metal adhesion of PET without an incorporated surfactant release agent is typically much greater than 150 g/in.

The preferred release agent is a surfactant or combination of surfactants. Preference is given to use of a mixture of anionic and nonionic surfactants. Optionally, hydrocarbon wax, such as paraffin wax, can be added to any or all layers of the film. Generally the greater amount of release agent present on the metal-contacting surface of the carrier film at a given layer thickness, the lower the metal adhesion and the more easily the metal strips from the transfer film.

Preferred release agent are surfactants that are either ionic, nonionic or a combination thereof. For cost effectiveness it is preferable that the release agent is present only in the outermost layer or layers, which are normally thinner than the total thickness of inner layers, i.e., non-skin layers.

Some examples of nonionic surfactants may be cetostearyl alcohol, stearyl alcohol, oleyl alcohol, cetyl alcohol, pentaethylene glycol monododecyl ether, polyoxypropylene glycol alkyl ethers, octaethylene glycol monododecyl ether, lauryl glucoside, polyoxyethylene glycol octylphenol ethers, octyl glucoside, and decyl glucoside.

Some examples of anionic surfactant may be perfluorooctanesulfonate, perfluorobutanesulfonate, sodium dodecylbenzenesulfonate, sodium sulphate, alkyl benzene sulfonates, dioctyl sodium sulfosuccinate, alkyl ether phosphate, alkyl aryl ether phosphate, sodium stearate; perfluorononanoate, perfluorooctanoate, sodium lauroyl sarcosinate, sodium myreth sulfate, sodium lauryl sulfate, sodium laureth sulfate, and ammonium lauryl sulfate, and more generally alphatic and aromatic sulphonates.

There are a number of companies that produce master batches of surfactant compounds in polyethylene terephthalate ("PET") for example, T7910 from Toray Industries, Inc. containing sodium dodecylbenzenesulfonate, Tas1125 from Sukano containing an aliphatic sulphonate, or Elecut® S618-A1 from Takemoto Oil and Fat containing a proprietary mixture of nonionic and anionic surfactants.

As presently understood, the parameter that mainly affects the desired degree of metal adhesion between the metal layer and an outermost polyester layer is the surface density, i.e., mass per unit area, of surfactant on the outermost surface of the polyester skin layer of the preferred polyester carrier film when the metal layer is applied. Surfactant that is initially uniformly dispersed within the polyester resin that forms the skin layer will bloom to the surface during the carrier film manufacturing process. The amount of surfactant incorporated in the polyester resin should take the blooming effect into account. That is, as thickness of the skin layer decreases, less surfactant-bearing polyester resin is used, and therefore, less surfactant at any given surfactant concentration in the polyester is available to migrate to the surface. Accordingly, the concentration of surfactant in the polyester resin to achieve a preselected level of metal adhesion should be increased as the thickness of the corresponding polyester layer decreases. The concentration of surfactant by weight in any outer layer should be at least about 0.01 wt %, preferably at least about 0.05 wt %, and more preferably at least about 0.10 wt %. The concentration of surfactant by weight in any outer layer is preferably less than 10 wt %, more preferably less than 5 wt %, and most preferably less than 3 wt %.

An advantageous feature of this is that the metal adhesion can be controlled to a preselected value within a narrow range by adjusting the concentration of release agent in the preferred polyester carrier film. Preferably the metal adhesion can be controlled to within a range of ±10 g/in of a target metal adhesion value. In a multilayer composite structure, the surfactant release agent particles should be present at least in the metal-contacting layer, but may also be present in other layers of the carrier film. Pursuant to the guidelines just described, the actual amount of surfactant will be adjusted depending upon the thickness of the skin layer to provide a suitable metal adhesion value and should be determined by one of ordinary skill in the art without undue experimentation.

An advantage, of the preferred polyester carrier film is that all of the layers of the preferred carrier film consist essentially of polyester. By "consists essentially of" is meant that the polymer content of the film is at least about 99 wt % and preferably exclusively polyester. The film can include, usually in small proportion to the polymer, and in addition to the operative surfactants, other non-polymeric ingredients such as stabilizers and additives that do not materially affect the novel aspects of the invention. Only the polymeric film remains after stripping the metal layer. Because the polymeric component of every layer of the carrier film is the same polymer, preferably PET, the residual carrier film can be recovered and recycled as a raw material for use in the same or a different end use application. Additional aspects, features and advantages of the invention will be explained, below.

In some end use applications it is desirable to transfer effectively all of the deposited metal whereas in other cases it is desirable to transfer only specific portions of the metal. According to this invention, all or any selected parts of the metal deposited onto the surface of the base layer may be readily transferred to the substrate utilizing well known techniques.

Typical schemes for a metal transfer process call for providing carrier films from film "converters", i.e., suppliers and processors of basic polymeric film who provide, treat and/or modify the basic polymeric film in secondary operations that are entirely separate from and subsequent to the manufacture of the basic film. For example, such secondary operations can include adding a polymer-containing release layer coating to an outer surface of the basic polymeric film to make a traditional composite carrier film. Another film converter process example is metalizing the release layer of a traditional composite carrier film via a process such as vapor deposition, sputtering. and the like to make a metal transfer film.

Metal transfer film technology can be used to place metal on substrates that are not directly metalizable by conventional means, such as paperboard. The paperboard converters specify, and the film converters supply transfer film with desired degrees of release layer metal adhesion based on the nature of the product and the metal. An advantage of the preferred polyester carrier film is the ability to control the bond strength of the metal to the PET carrier layer to a preselected value within the range of metal adhesion normally desired by paperboard converters. The metal transfer film of this invention does not have a special, non-polyester-based release layer between the base layer and the metal. Thus the carrier film metalizing converter can apply the metal in direct contact with the polyester layer of the carrier film. An intermediate release layer typically applied as a coating on the polymeric film is not required. This feature provides many productivity enhancing and cost saving benefits. It is especially valuable that the concentration of surfactant and optional wax release agent incorporated into the polymeric layer of the carrier film can modify the metal adhesion of the carrier film to match the different specifications for diverse metal transfer end use applications of metal transfer converters. The preferred polyester carrier film further can provide metal adhesion with precision of narrow tolerance limits of the metal transfer converters' targets.

The preferred polyester carrier film can provide a finished metal-coated substrate with an extremely high gloss appearance. A factor in making the metal-coated substrate glossy is surface roughness of the carrier film. The carrier film metal contacting surface should be smooth. That is, the smooth surface should have roughness Ra of about 5-150 nm. A more smooth surface has Ra of about 5-100 nm, and a very smooth surface has Ra of about 5-50 nm. A rough surface typically suitable to produce a matte appearance of the transferred metal, has an Ra of about 200-500 nm. Incorporation of small particles in the metal contacting outer layer of the carrier film can be used to adjust the roughness of the metal contacting surface to achieve desired gloss.

One embodiment of a preferred carrier film for use in this invention is a two layer PET film structure in which one layer is a skin layer with a thickness of preferably about 0.1-10 microns, more preferably about 0.2-6 microns, and most preferably about 0.3-2 microns. The second carrier film layer constitutes most of the structure thickness that is preferably about 5-75 microns, more preferably about 8-50 microns, and most preferably 10-25 microns. The second carrier film layer optionally contains wax added from ground, recycled, paraffin wax-coated film. The skin layer has a surface roughness, Ra, of preferably about 5-500 nm, more preferably about 5-200 nm, and most preferably about 5-50 nm.

Another preferred embodiment is a three layer PET film structure in which the non-skin carrier film layer is substantially free of added particles. One or both skin layers have release properties by incorporation of surfactants. The skin layers preferably have a thickness of about 0.1-5 microns, more preferably about 0.2-3.6 microns, and most preferably about 0.3-2 microns. The non-skin carrier film layer can contain wax release agent from addition of recycled paraffin wax coated film. The carrier film has a thickness of about 5-75 microns, more preferably about 8-50 microns, and most preferably about 10-25 microns.

The polyester that can be used in this invention is a polyester composed of an aromatic dicarboxylic acid, alicyclic dicarboxylic acid or aliphatic dicarboxylic acid and a diol. The aromatic dicarboxylic acids that can be used here include, for example, terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid and 4,4'-diphenylsulfonedicarboxylic acid. Among them, terephthalic acid, phthalic acid and 2,6-napthalenedicarboxylic acid can be preferably used. As the alicyclic dicarboxylic acid, for example, cyclohexanedicarboxylic acid can be used. The aliphatic dicarboxylic acids that can be used here include, for example, adipic acid, suberic acid, sebacic acid and dodecanedionic acid. One of these acids can be used, or two or more of them can also be used in combination.

The diols that can be used here include, for example, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, and polyalkylene 2,2'-bis (4'-β-hydroxyethoxyphenyl)propane. Among them, preferable are ethylene glycol, 1,4-butanediol, 1,4-cyclohexanedimethanol and diethylene glycol. Especially preferable is ethylene glycol. One of these diols can be used, or two or more of them can also be used in combination.

The polyester may also be copolymerized with another compound such as trimellitic acid, pyromellitic acid, glycerol, pentaerythritol, 2,4-dihydroxybenzoic acid, lauryl alcohol or phenyl isocyanate, as far as the polymer is substantially linear. As the polyester of this invention, polyethylene terephthalate (PET), polyethylene-2,6-naphthalenedicarboxylate (PEN) or a copolymer thereof or a modification product thereof is especially preferable. PET is the most preferred polyester.

Metal Transfer Film

The term "metal transfer film" herein means a carrier film with a transferable metal layer. A side of the carrier film defines a metal contact surface and the transferable metal layer is adjacent, and in direct contact with the metal contact surface. The metal transfer film according to this invention further includes an adhesive layer of a retention adhesive composition described in greater detail, below. The adhesive layer is positioned adjacent and in direct contact with the side of the metal layer opposite the carrier film.

The transferable metal layer can be formed on the carrier film by arty of well known techniques and can be extremely thin. Representative formation methods include vapor deposition such as electron beam deposition, induction deposition, magnetron sputtering and chemical vapor deposition. Thickness of the metal layer is determined by the end use application of the article on which the metal layer is to be transferred. Typically the thickness is in the range of about 5 nm to about 100 nm. Preferably the thickness is characterized in units of optical density (OD) referring to degrees of light transmission through an optically clear film on which the metal layer is placed. Transferable metal layer thickness should be at least about 0.1 OD, preferably at least about 1 OD, more preferably at least about 2 OD. The thickness should be less than about 10 OD, preferably less than about 5 OD, more preferably less than about 4 OD. and most preferably less than about 3 OD. One OD unit corresponds approximately to 18 nm.

The Retention Adhesive

The retention adhesive suitable for use in this invention is the barrier layer composition disclosed in my U.S. patent application Ser. No. 14/529,750. The barrier layer composition is a polymer including polyvinyl amine monomer which is crosslinked with citric acid. Preferably the polymer is polyvinyl alcohol/polyvinyl amine copolymer (PVOH/PVA). Unless otherwise stated, the term "PVOH/PVA" herein means polyvinyl amine or polyvinyl alcohol/polyvinyl amine copolymer. The crosslinked product of the polyvinyl amine polymer is sometimes referred to as "modified PVA polymer" or "c-PVA". A crosslinking agent in addition to citric acid, such as epichlorohydrin, optionally can be included to form the c-PVA material.

In use as a component of the novel metal transfer film, the retention adhesive exists in the form of a dry, non-tacky, solid layer affixed to the transferable metal layer of the film. Preferably, layer of retention adhesive is created by depositing on the bare surface of the metal layer a liquid coating of solution of the adhesive dissolved in a solvent. The solvent is removed thereby leaving a dry layer of retention adhesive on metal transfer film. Usually solvent removal includes heating the coating solution. Heat of solvent removal also causes the citric acid and optional additional crosslinking agent to crosslink the polvinyl amine monomer to produce c-PVA of the retention adhesive.

Preferably solvent for the liquid coating solution mainly consists essentially of water. The following liquid coating solution makeup procedure is preferred. Solvent, PVOH/PVA and surfactant are charged to vessel, heated to about 200-205° F. (93-98° C.) and agitated to obtain a uniform mixture, typically for about 1 hour. This solution can then be cooled to room temperature and stored until needed for coating on the metal surface. Up to thirty days prior to coating the retention adhesive on the metal, citric acid is added to the PVOH/PVA-surfactant solution. Prior to, during or after the citric acid addition, the solution is heated to about 120-140° F. (49-60° C.), preferably about 130° F. (54° C.) for a duration effective to completely dissolve the citric acid. The amount of citric acid added is selected to obtain a solution pH of about 5-6.

Although solute components of the solution can be charged to and dissolved in the solvent in any order including simultaneously, care should be taken to avoid excessive citric acid crosslinking of the PVOH/PVA early in the preparation process as this can result in crosslinked particles settling from the solution unless appropriate precautions are taken. For example, if citric acid is added before PVOH/PVA is fully dissolved, dissolution temperature can be lowered to about 140-150° F. (60-66° C.) and solution mixing time extended to achieve complete solution without substantial crosslinking. Also, the solution can be continously or intermittently agitated in storage to prevent crosslinked (PVOH/PVA) particles from settling prior to metal coating.

An optional additional crosslinking agent can be utilized in conjunction with citric acid to form the c-PVA composition. When such an additional crosslinking agent is utilized, it is added to the liquid coating solution after the PVOH/PVA polymer component is added, and preferably after the PVOH/PVA polymer is dissolved.

The dry retention layer thickness on the metal transfer film is equivalent to a coating density on dry basis of about 0.1-0.39 pound per ream (about 0.16-0.63 $g/m^2$), and preferably about 0.12-0.2 pound per ream (about 0.2-0.32 $g/m^2$). For these specifications, 1 ream is equal to 3,000 $ft^2$ (279 $m^2$).

The retention adhesive layer according to this invention is able to provide good barrier properties to oxygen, moisture and odorous chemical compounds. This feature is useful for end use applications, such as food packaging and the like, that seek to resist transmission into or out of a container covered with a metalized substrate. That is, migration of these compounds through the metalized substrate is significantly resisted by the retention adhesive layer. The layer of retention adhesive should provide OTR about 0.005-0.2 $cm^3/100$ $in^2$/day (about 0.08-3.1 $cm^3/m^2$/day) and MVTR about 0.05-0.13 g/100 $in^2$/day (about 0.8-2 $g/m^2$/day), Preferably, it provides OTR in the range of about 0.008-0.06 $cm^3/100$ $in^2$/day (about 0.12-0.93 $cm^3/m^2$/day) and MVTR about 0.07-0.12 g/100 $in^2$/day (about 1.1-1.9 $g/m^2$/day), MVTR values apply under ambient challenge conditions of 100° F. (38° C.) and 90% relative humidity. OTR values of about 0.008-1.2 $cm^3/100$ $in^2$/day (about 0.12-18.8 $cm^3/m^2$/day) apply under ambient challenge conditions of 73° F. (23° C.) and 0% relative humidity.

The retention adhesive composition bonding metal to the substrate is a citric acid crosslinked polyvinyl amine. Citric acid has the formula $HOOCCH_2C(OH)(COOH)CH_2COOH$, a melting point of 153° C. and water solubility of 240 g/100 g $H_2O$ at 25° C. A suitable example of acceptable citric acid is food grade, white, solid powder, water soluble pH 2.1, CAS No. 77-92-9 anhydrous citric acid available from Duda Energy, LLC (Decatur, Ala.). Having multiple potentially reactive carboxyl functional groups per molecule, citric acid is able to cross link with the amine moiety present on the polyvinyl amine, as explained by the reactions described in greater detail below. Thus in connection with this invention, the terms "modification" and "modified polyvinyl amine" are sometimes referred to respectively herein as "crosslinked" and "crosslinked polyvinyl amine" and the like.

The polymeric component of the adhesive is polyvinyl amine. Although expected to have good gas barrier properties when reacted with citric acid according to this invention, polyvinyl amine tends to become increasingly brittle and inflexible as the vinylamine content increases. Vinylamine homopolymer and vinylamine copolymers having large proportions of vinylamine are thus less preferred for use in the barrier layer especially in packaging film utilities. The barrier layers produced from such high vinylamine content polymer frequently craze, crack, and delaminate from the substrate during movement occurring in many end use applications. This behavior can render the gas barrier ineffective and impracticable.

Copolymers of polyvinyl amine that have good filmforming, flexural and pliant mechanical properties are particularly suitable for use in this invention. Preference is given to polyvinyl alcohol/polyvinyl amine (PVOH/PVA) copolymer. Preferably polyvinyl amine content of the PVOH/PVA should be less than about 25 mole %, more preferably less than about 20 mole %, and most preferably less than about 18 mole %. To provide desirable moisture vapor and oxygen barrier performance in packaging films, PVOH/PVA of the barrier layer should contain at least about 5 mole % polyvinyl amine, preferably at least about 8 mole % and more preferably at least about 10 mole %.

Water soluble vinyl amine polymer is preferred. A representative example of vinyl amine polymer suitable for use in this invention is Ultiloc® 5003 BRS (available from Sekisui Specialty Chemicals America, LLC) PVOH/PVA copolymer. It is a nominal 12 mol % vinylamine/88 mol % vinyl alcohol copolymer with an amine content of about 2.3-2.6 meq $NH_2$/gram, a weight average molecular weight of about 10,000-20,000, a viscosity at 20° C. in 4% aqueous solution of about 5-10 cps, (0.005-0.010 Pa·s) a pH in 4% aqueous solution of about 9-12, a glass transition temperature "Tg" for the powder of about 85-100° C., and a melting point for the powder of about 180-220° C. Ultiloc 5003BRS can be readily dissolved in water up to about 20 wt % non-volatile solids. The term "non-volatile solids ("NVS")" refers to the dry concentration of components that may be provided as a liquid or in a liquid medium (such as solid components suspended or dissolved in a liquid) after the liquid is removed by evaporation.

In the retention adhesive of this invention the vinyl amine polymer can be crosslinked with an optional crosslinking agent in addition to citric acid. Representative crosslinking agents that are useful for crosslinking vinyl amine polymer in accord with this invention include the following: melamine-based cross-linker, epoxy-based cross-linker, aziridine-based cross-linker, epoxyamide compounds, titanate-based coupling agents (e.g., titanium chelate), oxazoline-based cross-linker, isocyanate-based cross-linker, methylolurea or alkylolurea-based, aldehyde-based, and acrylamide. Preferred additional crosslinking agents are glyoxal and epichlorohydrin.

Formation of the c-PVA applicable to this invention may be better understood through explanation of the reaction scheme shown in the following formulae (I)-(IV) in which R is the citric acid radical $HOOCCH_2C(OH)(COOH)CH_2$ and P represents the polymer chain of vinyl amine polymer such as PVOH/PVA copolymer onto which the amine functional group is substituted. In (I) citric acid reacts with polymeric amine to form an ammonium carboxylate salt. Heating to temperature above about 100° C. removes water from the salt and produces polymeric amine in (II). Polymeric amine reacts with deprotonated carboxylic acid anion in (III) to produce crosslinked polymeric amide by further splitting off a hydroxyl anion in (IV). This reaction scheme is surprising because the direct reaction of a carboxylic acid with an amine should be difficult due to known preference of the basic amine to deprotanate the carboxylic acid to form a very unreactive carboxylate. However, it has been discovered that heating the ammonium carboxylate to a temperature above 100° C. drives off water and produces an amide.

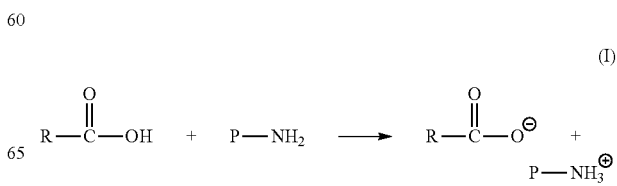

-continued

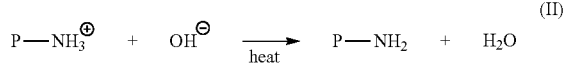
(II)

(III)

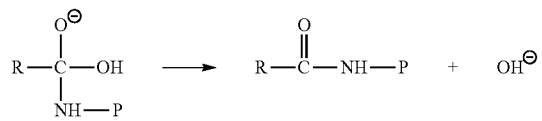
(IV)

One aspect of this invention relates to formation of a solution that can be coated onto the metal layer. The solution includes vinyl amine polymer particles and citric acid particles dissolved in a solvent. The preferred solvent is water. Polar co-solvents with water such as methanol, ethanol, propanol, and mixtures thereof can optionally be used. Preferably cosolvents have volatility sufficiently high to enable rapid evaporation from solution coated film at temperature of at least about 100° C. The amount of solvent is selected to be suitable to completely dissolve all solid components of the solution. Solutions typically have a concentration in the range of about 3-30 wt % total non-volatile solids ("NVS") content, preferably about 10-20 wt %, and more preferably about 12-16 wt %. Concentration of solute in solution can affect solution viscosity. The higher the concentration of non-volatile solids, the more cost-effective the coating becomes as less water needs to be driven off. However, higher solids content increases solution viscosity. If solids content is too high, the solution can be too viscous to easily handle and apply in substrate coating operations. Viscosity of the coating solution is preferably less than about 200 cps (0.20 Pa·s), and more preferably about 100-200 cps (0.10-0.20 Pa·s).

Great preference is given to first substantially completely dissolving the citric acid particles prior to charging and dissolving vinyl amine polymer, in particular PVOH/PVA particles in the solution. Although it is intuitive that vinyl amine polymer particles and citric acid particles could be dissolved in any order or together, it is understood that adding vinyl amine polymer after citric acid is dissolved provides better (i.e., lower) coating solution viscosity, shear stability, solution storage stability and superior gas barrier properties in the ultimately formed barrier film. The mixtures of vinyl amine polymer, citric acid and water can be heated to increase the rate of dissolution. Typical dissolving temperature is in the range of about 85° C.-100° C. Dissolving is also usually facilitated by moderate agitation of the mixture and normally is completed within about 15-60 minutes.

The amount of citric acid depends mainly on the quantity of PVA polymer in solution. The citric acid should be present to provide carboxylic acid functional groups at least stoichiometrically equal to the reactive amine in the vinyl amine polymer. Preferably acid:amine weight ratio should be in the range from about 0.1:1 to about 0.3:1, more preferably from about 0.13:1 to about 0.17:1 and most preferably about 0.15:1.

A process parameter for effectively controlling the proper proportion of citric acid to PVOH/PVA copolymer is pH of the liquid aqueous coating solution. A typical aqueous solution of about 14 wt % PVOH/PVA has a pH of about 11-12. Adding citric acid to solution lowers the pH. Generally, the more citric acid, the lower pH of solution and the greater extent of crosslinking of PVOH/PVA can be expected. A significant amount of citric acid crosslinking of the PVOH/PVA is desirable.

Additional solvent-miscible liquid and solvent-soluble, solid components optionally can be added and dissolved in the coating liquid aqueous solutions. Usually these added components are present in small proportions relative to vinyl amine polymer and citric acid. For example, methanol and Dowanol™ DPM dipropylene glycol methyl ether (The Dow Chemical Company) "DPM" can be incorporated in the aqueous solution at about 2-20 wt %, and preferably about 10-15 wt %, of the NVS components in the solution. These materials are included to improve the wetting performance of the solution on the surface of the metal for more uniform and complete liquid coating.

Formation of the c-PVA retention adhesive according to the scheme of reactions (I)-(IV) calls for presence of citric acid and vinyl amine polymer in a suitable aqueous liquid reaction medium with appropriate heating and dehydration conditions. Citric acid and amine reaction temperature for the polyamide formation can occur in the range of about 70° C.-185° C. The reaction proceeds faster at higher temperatures. Also, drying of solvent occurs more rapidly at higher temperatures. At temperatures between about 150° C. and about 185° C., the amine-citric acid reaction rate and the removal of solvent by vaporization from the aqueous liquid coating solution are such that a dry layer of c-PVA can be formed on metal within a residence time normally of less than about 1 minute, preferably from about 5-30 seconds, and more preferably in the range of about 10-20 seconds.

The retention adhesive layer can be formed on the metalized carrier film by inline or off-line methods. The former method is accomplished by fabricating a continuous web of carrier film of structure described above. The web is then metalized with a transferable layer of metal continuously after creating the self-supporting carrier film. Continuously thereafter, solution of the c-PVA precursor components previously prepared is deposited onto the metal surface to form a coated metal transfer film. Promptly and continuously thereafter, the coated film is subjected to ventilated heat treatment and in a film drying unit operation to volatilize the solvent and crosslink the PVA with citric acid. The resulting metal transfer film with metal layer sandwiched between carrier film and dry, non-tacky solid retention adhesive layer can be used immediately for metal transfer or processed for storage. For example it can be wound up on rolls, or cut into discrete sheets for storage.

In an "off-line" method the carrier film can be produced and metalized then packaged, stored and or transported for depositing retention adhesive in different operation units. Also the carrier film can be formed at a film manufacturing facility and metalized at a different site by a metal transfer film conversion unit operation. That is, the carrier film, metalized carrier film and completed, metal transfer film with retention adhesive layer can be produced in separate steps usually at different locations.

Various solution coating methods well known in the art may be used after formation of the transferable metal layer on the carrier film. Repesentative examples include dip, spray, paint, doctor, gravure and Mayer (sometimes referred to as "Meyer") rod type techniques. Typically a Mayer rod coater with a No. 2, 3 or 4 Mayer rod can be used for off-line processing methods. For inline production, liquid coating solution is applied while the metalized carrier film moves continuously through the coating apparatus application station. The same solution coating technologies for off-line coating may be used, with reverse gravure roll coating techniques being preferred.

Metal Transfer Process

Because the retention adhesive layer on the metal transfer film is a dry, non-tacky solid, conventional metal transfer film unit operations well known in the art can be adapted to transfer the metal to the product article substrate. That is, the transfer film is brought adjacent to the substrate such that the retention adhesive directly contacts the surface of the substrate. Heat and pressure are applied, for example, by pressing the transfer film against the substrate by a heated roll, to the mated transfer film and substrate effective to activate the adhesive to create a permanent bond. After bonding, the carrier film can be removed, typically by cooling the film-substrate composite and peeling away from the bonded metal layer. This leaves the substrate coated with a metal layer bonded by the retention adhesive.

The state of the retention adhesive is only partially crosslinked on the metal transfer film prior to metal transfer. Preferably, less than about 50% of the PVOH/PVA and more preferably less than about 40% of the PVOH/PVA should be crosslinked at this stage. Partial crosslinking is advantageous because it permits the retention adhesive to soften in the range of about 170° F.-220° F. (77° C.-104° C.), preferably about 150° F.-200° F. (66° C.-93° C.) during metal transfer film-to-substrate contact to create a good bond. It also allows the citric acid to further crosslink the polymeric component to achieve superior barrier properties of the cured retention adhesive layer at low temperatures that do not adversely affect the substrate material. The retention adhesive should be sufficiently crosslinked on the metal transfer film prior to metal transfer to be a non-tacky, dry, solid at low temperatures, i.e., less than about 122° F. (50° C.) for ease of metal transfer film handling. Preferably at this stage the retention adhesive should be at least about 10% crosslinked, and more preferably at least about 20% crosslinked.

EXAMPLES

This invention is now illustrated by examples of certain representative embodiments thereof, wherein all parts, proportions and percentages are by weight unless otherwise indicated.

Test Methods

Thickness: Overall film thicknesses were measured by micrometer using a stack of 10 sheets and dividing the measurement by 10. Measurements were repeated every 9 inches in the transverse direction of the web. The thickness of each coextruded layer of the multilayer film was calculated by the ratio of the corresponding extrusion flow rate to the total extrusion flow rate of all layers.

Metal Adhesion: Metal adhesion was measured by a 180 degree ethylene acrylic acid polymer peel test consisting of heat sealing an adhesive layer of Dow Primacor® 3300 EAA polymer to the metalized side of the film using a Sentinel Model 12-ASL Sealer at 220° F. and 38 psi for 20 seconds. An Instron® 4200-004 tensile test machine was used to measure the peel force to peel away the metal with the adhesive layer at 180 degrees from the metalized surface of the film.

Moisture vapor transmission rate (MVTR) of film was measured with a Permatran® 3/31 Water Vapor Transmission Rate Testing Device (Mocon Inc., Minneapolis Minn.) substantially in accordance with ASTM F1249.

Oxygen transmission rate (OTR) of film was measured with a Mocon Ox-tran® 2/20 Oxygen Permeability Testing Apparatus (Mocon Inc., Minneapolis Minn.) substantially in accordance with ASTM D3985.

Unless otherwise noted, films analyzed for MVTR and OTR were laminated to a substrate of PATCO 502A low density polyethylene/acrylic adhesive pressure sensitive tape (Berry Plastics, Bristol, R.I.) adhered to the barrier layer to simulate a typical finished package structure.

Surface Roughness: Surface roughness ("Ra") was measured by a Surfcorder Model SE-500 surface roughness measurement instrument. The measurements were repeated 3 times and the average value of Ra was recorded Surface Resistivity: Surface resistivity was measured with a concentric ring probe from TREK, Inc, Model No. 152 concentric ring probe resistivity meter according to ASTM Standard D 257-99. The testing conditions were 25° C. at 50% of relative humidity.

Surface Energy: Surface energy was determined by using the known numerical relationship between surface tension in dynes/cm of a polymer surface and the contact angle of a pure water drop deposited onto the surface (Zisman correlation). The contact angle was measured using a Contact Angle Meter (from Tantec, Schaumberg, Ill.) as described in U.S. Pat. No. 5,268,733.

Procedure: Three layer PET carrier films having A/B/C layer structure and two layer films having A/B layer structure for the examples were prepared by the following method. PET and ingredients listed in Table I, below, for each layer were blended, dried and then extruded in conventional melt extrusion equipment. To produce base layer B a serial set of single screw extruders was used. Reclaimed PET film was optionally included in this layer. For the composition of layers A and C, PET plus the other ingredients were mixed and fed through a counter-rotating twin screw extruder and dried via in-line vacuum in the melt zones of the extruder. Extrusion temperatures were in the range of 270° C. to 300° C. The melt flows from each extruder was filtered separately and then fed into a melt distributor such that the melt flow from the twin screw extruder was split to form layers A and C that were overlaid onto opposite sides of the melt flow forming layer B to form an overall A/B/C structure. To produce a two layer A/B structure, the twins screw extruder melt flow was overlaid only on one side of the base layer melt flow. The resulting combined melt flow entered a flat die set at about 270° C. The melt curtain exiting the die dropped and was electrostatically pinned onto a rotating casting roll chilled to about 20° C. causing the curtain to solidify into a continuously moving amorphous sheet. This sheet entered a set of rotating heated rolls of different speeds such that the traveling sheet was oriented about 4 times in the machine direction. Next, this machine-direction oriented sheet traveled into a multizone enclosed heated oven, where the film was first preheated to a temperature of about 90° C. In the next zone, at about 165° C., the moving film was oriented about 4 times in the transverse direction, and then heat set at about 240° C. Then the film was relaxed by about 3% in the relaxation zone of the oven. The resulting two layer A/B and three-layer A/B/C films were wound up into rolls as is standard industry practice.

Examples 1-12

Fabrication of Various Polyester Release Films

Example 1

A two layer PET carrier film was prepared by coextruding adjacent skin layer A and base layer B. Inert filler particles were dispersed in each of the molten polymer feeds to the film forming unit. Thickness and composition of the layers is shown in Table L The concentrations and sizes of the particles gave the outer surfaces of the layers different surface roughnesses. No metal release agent according to this invention was included in the layers. The outer layers had surface resistivity on the order of magnitude of $10^{16}$ ohms/sq. Analytical results for this and other examples are presented in Table II. The surfaces of layers A and B also had surface energies typical for PET film as indicated by surface tensions of 40 dynes/cm.

The surface of skin layer A was metalized with a layer of aluminum of thickness equal to a measured optical density ("OD") of 2.5 by metal vapor deposition. Metal adhesion of the aluminum layer on layer A was measured as 135 g/in. This is a high adhesion strength and would not be suitable for a metal transfer film.

Example 2

A two layer PET carrier film was prepared as in Ex. 1 with the exception that a release agent surfactant particles of sodium dodecylbenzenesulfonate at concentration 0.48% was uniformly dispersed into skin layer A. Surface resistivity of layer A was much reduced (order of magnitude of $10^{11}$ ohms/sq.) and the surface tension increased to surface tension of greater than 53.5 dynes/cm. The carrier film was coated with aluminum to an optical density of 2.5. Metal adhesion was measured to be 45.7 g/in. This represents a significant reduction relative to Ex. 1 The surface resistivity of layer B lowered slightly (relative to Ex. 1) but was still at the $10^{14}$ level.

Example 3

The procedure of Ex. 2 was repeated except that a blend of release agent surfactants alkane sulphonate (0.06%) and sodium sulfate (0.003%) was incorporated in skin layer A. Layer A had a surface resistivity on the order of $10^{16}$. Following aluminum metalization, metal adhesion was measured to be 26.7 g/in. The transfer film would be suitable for a metal transfer film.

Example 4

The procedure of Ex. 2 was repeated except that aliphatic sulphonate was substituted as the surfactant release agent at 0.015% in skin layer A. The surface resistivity reduced to a relatively low value of the order of magnitude of $10^{12}$ ohms/sq. After coating the skin layer with a 2.5 optical density thickness metal layer of aluminum, the metal adhesion was measured to be a very acceptable value of 11.2 g/in.

Example 5

The procedure of Ex. 4 was repeated except that the concentration of the surfactant release agent was doubled to 0.03%. Resistivity of layer A dropped to the $10^{10}$ range. After depositing aluminum to an optical density of 2.5, the metal adhesion was found to also drop to 11.2 g/in. that is very good for many metal transfer operations.

Examples 6 and 8

In these examples the procedure of Ex. 2 was repeated with a mixture of anionic/nonionic surfactants serving as the release agent. In Ex. 6 the concentration of the surfactant was 1.2% and in Ex. 8 the concentration was raised to 2.0%. Again, resistivities of the B layer remained at the $10^{14}$ level. The surfactant containing layer A showed nearly equal and significant resistivity reduction relative to Ex. 1. After coating with aluminum, metal adhesion of the 1.2% surfactant sample was well in the range of suitable metal transfer film at 7.9 g/in. Increasing the concentration to 2.0% surfactant lowered the metal adhesion farther to 6 g/in.

Example 7

The procedure of Ex. 2 was repeated except that the polymer of layer A was a blend of 50% virgin PET and 50% Auriga PET resin "8428". The Auriga PET resin contains surfactant. The surface resistivity of layer A did not change from that of Ex. 1 however, metal adhesion of the carrier film to the aluminum layer did reduce to 33.3 g/in, which is well into the acceptable range for metal transfer films.

Example 9

The procedure of Ex. 2 was repeated with the exception that 0.48% sodium dodecylbenzenesulfonate was added to thicker layer B as well as layer A. Due to the presence of surfactant in both layers, resistivities of both surfaces dropped to the approximate $10^{11}$ level. After metalization to 2.5 optical density with aluminum, the metal adhesion of layer A was determined to be 6.3 g/in. This result suggests an interaction between the layers in that the effect of the same surfactant at the same level in layer A was much enhanced by the surfactant in the adjacent layer B.

Example 10

The procedure of Ex. 6 was repeated except that 1.2% mixed anionic/nonionic surfactant was incorporated into thicker layer B as well as in layer A. Comparing this example to Ex. 6, it appears that the analytical results were somewhat analagous to those of Ex. 9. The surface resistivities of both A and B layers dropped by four orders of magnitude relative to Ex. 1. Additionally, the metal adhesion of layer A of 4.8 g/in. was significantly lower than in Ex. 1 and slightly lower than 6 g/in. of Ex. 6. Thus there is agreement with the suggestion that some interaction between the layers due to presence of the same release agent surfactant in both on the metal adhesion value of layer A.

Example 11

The procedure of Ex. 8 was repeated with the exception that the additives composition of layer B was changed. Firstly the 0.3 μm polystyrene particles incorporated into layer B at 0.06% was replaced by 0.3% of 2.4 μm silica particles. Additionally, layer B included 0.05% paraffin wax release agent. Analytical results showed that surface resistivity of layer A dropped similarly as in Ex. 8 to the $10^{10}$ level and that the metal adhesion reduced to a very low value of 2 g/in. The lower metal adhesion value further supports the suggestion that wax from layer B affects adhesion on the surface of layer A. Example 11 also has a relatively high surface energy of greater than 53.5 dynes/cm.

Example 12

A three layer PET film carrier film is prepared by coextruding an A/B/C composition and structure. Both skin layers A and C have the same calcium carbonate/aluminum oxide particle package for modifying the surface texture and a release agent of mixed anionic/nonionic surfactant at 2.0% concentration. The base layer B includes a silica particle component and 0.013% paraffin wax release agent. The surface of layer A was metalized with aluminum to a thickness equivalent to 2.5 optical density. The metal adhesion of the carrier film to the metal layer was 5.1 g/in.

TABLE I

| | A/B/C Layer Thickness (μm) | A Layer Composition | B Layer Composition | C Layer Composition |
|---|---|---|---|---|
| Ex. 1 | 5/28/0 | PET 1.5% 0.9 μm CaCO$_3$ | PET 0.06% 0.3 μm polystyrene | none |
| Ex. 2 | 5/28/0 | PET 1.5% 0.9 μm CaCO$_3$ 0.48% Sodium dodecyl-benzenesulfonate | PET 0.06% 0.3 μm polystyrene | none |
| Ex. 3 | 5/28/0 | PET 1.5% 0.9 μm CaCO$_3$ 0.06% Alkane sulphonate 0.003% Sodium sulphate | PET 0.06% 0.3 μm polystyrene | none |
| Ex. 4 | 5/28/0 | PET 1.5% 0.9 μm CaCO$_3$ 0.015% Aliphatic Sulphonate | PET 0.06% 0.3 μm polystyrene | none |
| Ex. 5 | 5/28/0 | PET 1.5% 0.9 μm CaCO$_3$ 0.03% Aliphatic Sulphonate | PET 0.06% 0.3 μm polystyrene | none |
| Ex. 6 | 5/28/0 | PET 1.5% 0.9 μm CaCO$_3$ 1.2% mixture of sodium dodecyl-benezesulfonate and a nonionic surfactant | PET 0.06% 0.3 μm polystyrene | none |
| Ex. 7 | 5/28/0 | PET (50% virgin PET (50% Auriga 8428 1.5% 0.9 μm CaCO$_3$ | PET 0.06% 0.3 μm polystyrene | none |
| Ex. 8 | 5/28/0 | PET 1.5% 0.9 μm CaCO$_3$ 2.0% mixture of sodium dodecyl-benezesulfonate and a nonionic surfactant | PET 0.06% 0.3 μm polystyrene | none |
| Ex. 9 | 5/28/0 | PET 1.5% 0.9 μm CaCO$_3$ 0.48% Sodium dodecyl-benzenesulfonate | PET 0.06% 0.3 μm polystyrene 0.48% Sodium dodecyl-benzenesulfonate | none |
| Ex. 10 | 5/28/0 | PET 1.5% 0.9 μm CaCO$_3$ 1.2% mixture of sodium dodecyl-benzenesulfonate and a nonionic surfactant | PET 0.06% 0.3 μm polystyrene 1.2% mixture of sodium dodecyl-benzenesulfonate and a non-ionic surfactant | none |
| Ex. 11 | 5/28/0 | PET 1.5% 0.9 μm CaCO$_3$ 2.0% mixture of sodium dodecyl-benzenesulfonate and a nonionic surfactant | PET 0.3% 2.4 μm silica 0.05% paraffin wax | none |
| Ex. 12 | 1.2/22/1.2 | PET 0.13% 1.0 μm CaCO$_3$ 0.3% 0.1 μm Al$_2$O$_3$, 2.0% mixture of sodium dodecyl-benzenesulfonate and a nonionic surfactant | PET 0.075% of 2.4 μm silica 0.013% paraffin wax | Same as Layer A |

TABLE II

| | A Layer Surface Resistivity at 25 deg C., 50% RH (ohms/sq) | B Layer Surface Resistivity at 25 deg C., 50% RH (ohms/sq) | A Layer Surface Tension by contact angle (dynes/cm) | B Layer Surface Tension by contact angle (dynes/cm) | A Layer Metal Thickness (optical density) | A Layer Metal Adhesion (g/in) |
|---|---|---|---|---|---|---|
| Comp. Ex. 1 | 1.8 × 10$^{16}$ | 3.1 × 10$^{16}$ | 40 | 40 | 2.5 | 135 |
| Ex. 1 | 1.1 × 10$^{11}$ | 1.6 × 10$^{14}$ | >53.5 | 40 | 2.5 | 45.7 |
| Ex. 2 | 2.2 × 10$^{16}$ | | | | 2.5 | 26.7 |
| Ex. 3 | 1.1 × 10$^{12}$ | | | | 2.5 | 11.2 |
| Ex. 4 | 4.3 × 10$^{10}$ | | | | 2.5 | 7.9 |
| Ex. 5 | 1.4 × 10$^{10}$ | 6.5 × 10$^{14}$ | >53.5 | 41 | 2.5 | 6 |
| Ex. 6 | 1.9 × 10$^{16}$ | | | | 2.5 | 33.3 |
| Ex. 7 | 1.2 × 10$^{10}$ | 5.7 × 10$^{14}$ | >53.5 | 41 | 2.5 | 5.2 |
| Ex. 8 | 8.0 × 10$^{10}$ | 1.6 × 10$^{11}$ | >53.5 | >53.5 | 2.5 | 6.3 |
| Ex. 9 | 1.6 × 10$^{10}$ | 1.1 × 10$^{10}$ | >53.5 | >53.5 | 2.5 | 4.8 |
| Ex. 10 | 1.2 × 10$^{10}$ | | >53.5 | | 2.5 | 2 |
| Ex. 11 | | | | | 2.5 | 5.1 |

Fabrication of Metal Transfer Film with Retention Adhesive

Example 13

Metal Transfer Film with Citric Acid Modified PVA Retention Adhesive

A 1.2 μm thick PET skin layer, A, a 9.6 μm thick PET core layer, B, and a 1.2 μm thick PET skin layer, C, were coextruded to form an A/B/C multilayer carrier film structure. Both skin layers A and C contained 2 wt % mixture of sodium dodecyl-benzenesulfonate and a nonionic surfactant, 0.11 wt % of 1.0 μm size calcium carbonate particles and 0.33 wt % of 0.10 μm size alumina particles dispersed therein. The core layer B includes 0.01 wt % of 0.1 μm size alumina particles. Prior to metalization surface roughness of layer A was Ra 26 nm and Sra 12 nm and the 60° gloss was 186 gloss units. Separate samples 13A-13F of the 48 gauge (12 μm) PET carrier film were respectively metalized with aluminum to thicknesses of 2.0, 2.2, 2.4, 2.6, 2.8 and 3.0 optical density. The metalized surface exhibited 878 gloss units at 60° and 1775 gloss units at 20°.

The metalized surface of each sample was coated by a Mayer Rod off line coating technique with a 14.2 wt % aqueous dispersion of a c-PVA composition. After drying, the coated c-PVA composition was 84.62 wt % Ultiloc® 5003 BRS PVOH/PVA copolymer (Sekisui Specialty Chemicals America, LLC), 0.71 wt % dried Surfynol® 420 defoaming surfactant, 0.85 wt % Polycup® 9200 epichlorohydrin (Ashland Inc., Columbus Ohio), and 13.82 wt % citric acid. Surfynol composition has ethylene oxide content of about 1.3 mol % or about 20 wt %, specific gravity at 25° C. of about 0.943, pH in a 1% aqueous solution of about 6-8, viscosity at 20° C. is less than 250 cps, hydrophile-lipophile balance is about 4, and volatile organic compound content by EPA method 24 of about 28 wt %. The dry coat of each sample was about 0.45 grams/m² ("gsm").

Similarly, a second set of the different metal thickness, metalized PET carrier film samples 13G-13L was coated with the same c-PVA composition to a dry coat of 0.32 gsm. Lastly, a third set of the different metal thickness, metalized PET carrier film samples 13M-13R was coated with the same c-PVA composition to a dry coat of 0.18 gsm. The carrier film/metal/retention adhesive metal transfer film sample embodiments of this invention were analyzed for oxygen transmission resistance (OTR) and moisture vapor transmission resistance.

Results presented in Table III indicate that oxygen and moisture barrier properties were generally excellent at low, middle and high retention adhesive coating amounts and that the degree of metal coating between 2.0 and 3.0 optical density did not affect the barrier properties. The PET has an OTR value of 29 cm³/m²/day (1.9 cc/100 in²/day) and MVTR value of 78 g/m²/day (5.0 g/100 in²/day). These data thus suggest that the c-PVA adhesive provides a significant barrier to transmission of oxygen and water vapor.

Examples 14-16

Metal Retained on Substrates with Citric Acid Modified PVA

Each of samples 13A-13R was individually contacted on the c-PVA side to a different substrate sheet. Compression and heat was applied using a Bench Top Laboratory model HL-100 hot roll laminator (Cheminstruments, Inc., Fairfield, Ohio) operating at 230° F. (110° C.) and 70 psi (480 kPa) to activate the c-PVA retention adhesive thereby bonding the metal to the substrate. Then the carrier film was peeled from the metal layer. For Example 14, the substrate was an 200 gauge (50 μm) monolithic transparent ("PA 66") PET film having OTR of 78 cm³/m²/day (5.0 cc/100 in²/day) at 23° C. (73° F.). For Example 15, the substrate was a thinner, 92 gauge (23 μm) monolayer Lumirror™ PA66 PET film (Toray Plastics (America), N. Kingstown, R.I.), and for Example 16, the substrate was a 2.9 mm (0114 inch) thick sheet of Unifoil™ paperboard (Unifoil Corporation, Fairfield, N.J.) white packaging board stock.

The metal/retention adhesive/substrate was analyzed for oxygen transmission resistance (OTR) and moisture vapor transmission resistance. Results are presented in Table III. The data show that for comparatively smooth and low porosity surfaced substrates such as PET film, the high barrier quality of the c-PVA retention adhesive advantageously transfers to the metalized product composite. Even for rough, porous substrate as in Ex. 16, the product at least does have measurable, albeit high, OTR values. This suggests that the transferred retention adhesive layer contains minute discontinuities that allow vapor to pass. Lack of very good barrier properties of which a continuous layer of the c-PVA adhesive is capable as demonstrated by Exs. 13-15, is not deemed critical for the highly valued retention adhesive performance of the c-PVA composition in metal transfer end use applications.

TABLE III

| | Al thickness OD | c-PVA adhesive (g/m²) | Ex 13 OTR cm³/ 100 in²/ day | Ex 13 MVTR g/ 100 in²/ day | Ex 14 OTR cm³/ 100 in²/ day | Ex 14 MVTR g/ 100 in²/ day | Ex 15 OTR cm³/ 100 in²/ day | Ex 15 MVTR g/ 100 in²/ day | Ex 16 OTR cm³/ 100 in²/ day | Ex 16 MVTR g/ 100 in²/ day |
|---|---|---|---|---|---|---|---|---|---|---|
| A | 2.0 | 0.45 | 0.04 | 0.08 | 0.08 | 0.030 | 0.02 | 0.02 | ND | NR |
| B | 2.2 | 0.45 | 0.01 | 0.07 | 0.10 | 0.077 | 0.02 | 0.03 | 6125 | NR |
| C | 2.4 | 0.45 | 0.06 | 0.30 | 0.01 | 0.037 | 0.12 | 0.05 | ND | NR |
| D | 2.6 | 0.45 | 0.01 | 0.05 | 0.53 | 0.171 | ND | ND | 5428 | NR |
| E | 2.8 | 0.45 | 0.02 | 0.06 | 0.02 | 0.029 | ND | ND | ND | NR |
| F | 3.0 | 0.45 | 0.02 | 0.07 | 0.02 | 0.016 | 0.01 | 0.02 | ND | NR |
| G | 2.0 | 0.32 | 0.02 | 0.07 | ND | ND | ND | ND | 5100 | NR |
| H | 2.2 | 0.32 | 0.23 | 0.08 | 0.03 | 0.021 | ND | ND | ND | NR |
| I | 2.4 | 0.32 | ND | 0.10 | 0.04 | 0.005 | ND | ND | ND | NR |
| J | 2.6 | 0.32 | 0.04 | 0.11 | 0.05 | 0.029 | ND | ND | ND | NR |
| K | 2.8 | 0.32 | 0.09 | 0.08 | 0.01 | 0.033 | 0.02 | 0.04 | ND | NR |
| L | 3.0 | 0.32 | 0.03 | 0.14 | 0.03 | 0.030 | 0.05 | 0.04 | ND | NR |
| M | 2.0 | 0.18 | 0.01 | 0.12 | 0.06 | 0.009 | 0.12 | 0.04 | ND | NR |

TABLE III-continued

| | Al thickness OD | c-PVA adhesive (g/m²) | Ex 13 OTR cm³/100 in²/day | Ex 13 MVTR g/100 in²/day | Ex 14 OTR cm³/100 in²/day | Ex 14 MVTR g/100 in²/day | Ex 15 OTR cm³/100 in²/day | Ex 15 MVTR g/100 in²/day | Ex 16 OTR cm³/100 in²/day | Ex 16 MVTR g/100 in²/day |
|---|---|---|---|---|---|---|---|---|---|---|
| N | 2.2 | 0.18 | 0.07 | 0.11 | ND | ND | ND | ND | ND | NR |
| O | 2.4 | 0.18 | 0.13 | 0.13 | 0.07 | 0.040 | 0.09 | 0.03 | ND | NR |
| P | 2.6 | 0.18 | ND | 0.07 | 0.08 | 0.025 | ND | ND | ND | NR |
| Q | 2.8 | 0.18 | 0.04 | 0.05 | 0.07 | 0.076 | ND | ND | ND | NR |
| R | 3.0 | 0.18 | 0.02 | 0.08 | ND | ND | ND | ND | 4023 | NR |

ND = no data available
NR = not readable (exceeded scale of analytical method)

Example 17 and Comparative Examples 18-20

Performance of Retention Adhesive Compositions

For Example 17, the same three layer PET carrier film described in Ex. 13 was metalized with an aluminum layer to a thickness equivalent to 2.2 OD. The metalized surface was off-line coated using a No. 3 Mayer rod coater with an aqueous dispersion of a c-PVA composition as described in Ex. 13. After drying at about 104° C.-138° C. (220° F.-280° F.) a dry coating of 0.32 gsm c-PVA retention adhesive was on the metal transfer film. A substrate of 92 gauge (23 µm) thickness monolithic PET film was brought in contact with the c-PVA adhesive side of the metal transfer film. The assembled substrate and metal transfer film were passed through a Bench Top Laboratory model HL-100 hot roll laminator (Cheminstruments, Inc., Fairfield, Ohio) operating at 430° F. (232° C.) and 70 psi (480 kPa) pressure to activate the retention adhesive and affix the metal layer to the PET film. The PET carrier film was removed by peeling from the metalized substrate.

The substrate was inspected by visual and microscopic observation to evaluate the nature of metal that successfully transferred to the substrate. The substrate was uniformly and completely covered with metal exhibiting a glossy finish. No macroscopic flaking or microscopic pinhole discontinuities were observed indicating that the c-PVA retention adhesive functioned effectively.

For Comp. Ex. 18, the procedure of Ex. 17 was repeated except that a 100 percent polyurethane with surfactants retention adhesive was used in place of c-PVA. The adhesive material was NeoRez® waterborne polyurethane resin 1051I-2-25 (DSM NeoResins B.V., Waalwijk, Netherlands). After removal of the carrier film, metal transferred to the substrate was flaking and microscopy showed pinholes of surface not covered with metal, indicating adhesion strength was poor.

For Comp. Ex. 19, the procedure of Ex. 17 was repeated except that an acrylic adhesive was used in place of c-PVA. The acrylic adhesive composition coated on the metal was 99.82 wt % acrylic emulsion polymer CK-77NS-M (Cork Industries, Folcroft, Pa.), 0.04 wt % wax, 0.10 wt % zinc ammonium carbonate and 0.04 wt % ammonium hydroxide. After removal of the carrier film, there was complete macroscopic transfer of metal to the substrate (i.e. no flaking or non-metal areas visible to the eye), however, the metal appearance was not glossy. Also microscopic inspection revealed pinhole discontinuities in the metal layer on the substrate.

For Comp. Ex. 20, the procedure of Ex. 17 was repeated except that a polyvinyl alcohol/ethylenevinyl alcohol copolymer adhesive from Toray Plastics (America), North Kingstown, R.I., was used in place of c-PVA. The composition coated on the metal was 58.61 wt % Selvol™ 502 polyvinyl alcohol (Sekisui Chemical Company, Ltd.), 28.25 wt % Exceval™ RS-2117 ethylene vinyl alcohol copolymer, 0.87 wt % Surfynol® 420 defoaming surfactant, and 12.27 wt % glyoxal crosslinking agent (Freechem® 40DL from Emerald Performance Materials). After removal of the carrier film, there was inconsistently complete macroscopic transfer of metal to the substrate in different trials and microscopic inspection revealed pinhole discontinuities in the metal layer on the substrate.

Ex. 17 and Comp. Exs. 18-20 indicate that c-PVA is a strong retention adhesive suitable for metal transfer operations and is able to enable a consistently complete, clean, glossy metal transfer from the metal transfer film to the substrate. Examples 13-16 also show that c-PVA retention adhesive provides excellent barrier properties for smooth surfaced substrates. Modified polyvinylamine liquid can be coated onto the exposed surface of a metal transfer film and permitted to dry so that it is available for completing metal transfer at a later time. The dry c-PVA adhesive coated metal transfer film can be wound up, stored, distributed to converters who can then neatly complete metal transfer onto substrates using heat and compression. The converter does not need to apply a wet retention adhesive to the substrate in the metal transfer operation.

Example 21

Preparation of c-PVA Coating Solutions

The PVA for the citric acid modified PVA was Selvol™ Ultiloc™ 5003 BRS (Sekisui Specialty Chemicals of America, Dallas Tex.) 12 mole % vinyl amine/88 mole %/vinyl alcohol copolymer. For Example 21, an aqueous solution of the PVA was prepared. To this solution was added Surfynol® 420 antifoam/leveling surfactant (Air Products and Chemicals, Inc.), citric acid and additional Polycup® 9200 epichlorohydrin (Hercules, Inc.) crosslink agent. Citric acid concentration was effective to give the aqueous solution a pH of 5. The dry weight basis of components was 84.63 wt % PVA, 0.71 wt % Surfynol 420 surfactant, 0.85 wt % epichlorohydrin and 13.82 wt % citric acid.

Example 22 was formed with the same components as Ex. 21 except that citric acid was added to the aqueous solution in amount to achieve a solution pH of 9. The dry weight basis of components was 90.77 wt % PVA, 0.76 wt % Surfynol 420 surfactant, 0.91 wt % epichlorohydrin and 7.56 wt % citric acid.

To make the c-PVA coating solution of Example 23, coalescent dipropylene glycol methyl ether (DPM) was added to the components of Example 22. The dry weight basis of components was 82.98 wt % PVA, 0.69 wt % Surfynol 420 surfactant, 1.95 wt % DPM, 0.83 wt % epichlorohydrin and 13.55 wt % citric acid.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope of the following claims. The entire disclosures of U.S. patents and patent applications identified in this application are hereby incorporated by reference herein.

What is claimed is:

1. A metal transfer film used in transferring a thin layer of a metal onto a substrate, the film having a thickness of about 4-75 μm and consisting of (A) a carrier film comprising polymer and release agent, and defining a metal contact surface on one side of the carrier film, (B) a transferable layer of the metal in direct contact with the metal-contacting surface of the carrier film and having a thickness equivalent to an optical density of about 0.2 to about 4, and (C) an optically clear, dry, nontacky adhesive layer of retention adhesive directly in contact with the transferable layer on a side of the metal transfer film opposite the carrier film, the retention adhesive comprising modified polyvinyl amine composed of a vinylamine polymer crosslinked by citric acid.

2. The metal transfer film of claim 1 in which the carrier film consists essentially of (i) polyester and (ii) release agent homogeneously blended with a polymeric binder, the release agent selected from the group consisting of anionic surfactant, non-ionic surfactant, about 0.1-1 wt % paraffin wax dispersed in the polymeric binder, and a combination thereof, in which the polymeric binder is a polyester of position that is the same or different from the polyester of component (i) and in which the metal-contacting surface of (A) exhibits a specular reflection of at least 160 gloss units measured by glossmeter at a 60° angle and the release agent is present in the carrier film in amount effective to provide the metal-contacting surface of (A) with a preselected adhesion value to the metal in the range of about 0.4-39 g/cm (1-100 g/in) measured by a 180 degree ethylene acrylic acid polymer peel test.

3. The metal transfer film of claim 2 in which the transferable layer of metal of (B) exhibits a specular reflection of at least 830 gloss units measured by glossmeter at a 60° angle.

4. The metal transfer film of claim 1 having moisture vapor transmission rate and oxygen transmission rate at most equal to that of a composite control film consisting essentially of the carrier film, the transferable layer of metal, and a layer of polyvinyl alcohol of thickness of equal thickness to the adhesive layer.

5. The metal transfer film of claim 2 in which the carrier film further consists of finely divided solid particles uniformly dispersed in a continuous phase of polyester of composition that is the same or different from the polyester of component (i) and in which the solid particles are present in concentration and size effective to provide the metal-contacting surface with roughness characterized by Ra at most about 50 nm and Sra at most about 30.

6. The metal transfer film of claim 1 in which the vinylamine polymer is polyvinyl alcohol/polyvinyl amine copolymer.

7. The metal transfer film of claim 1 of which the oxygen transmission rate is about 0.005-0.2 cm$^3$/100 in$^2$/day (about 0.08-3.1 g/m cm$^3$/m$^2$/day) and the moisture vapor transmission rate is about 0.05-0.13 g/100 in$^2$/day (about 0.8-2 g/m$^2$/day).

8. The metal transfer film of claim 1 in which the modified vinyl amine polymer is polyvinyl alcohol/polyvinyl amine copolymer crosslinked by reaction with a combination of citric acid and at least one crosslinking agent other than citric acid.

\* \* \* \* \*